United States Patent
Tsai et al.

(10) Patent No.: US 9,288,103 B2
(45) Date of Patent: Mar. 15, 2016

(54) METHOD OF MAINTAINING A CONNECTION AND ELECTRONIC APPARATUS USING THE SAME

(71) Applicant: Acer Inc., New Taipei (TW)

(72) Inventors: I-Feng Tsai, New Taipei (TW); Shu-Yu Jiang, New Taipei (TW); Meng-Ta Tsai, New Taipei (TW)

(73) Assignee: Acer Inc., New Taipei (TW)

( * ) Notice: Subject to any disclaimer, the term of this patent is extended or adjusted under 35 U.S.C. 154(b) by 148 days.

(21) Appl. No.: 14/077,275

(22) Filed: Nov. 12, 2013

(65) Prior Publication Data

US 2014/0254409 A1    Sep. 11, 2014

(30) Foreign Application Priority Data

Mar. 8, 2013    (TW) .............................. 102108239 A

(51) Int. Cl.
| | |
|---|---|
| *H04L 29/08* | (2006.01) |
| *H04L 12/26* | (2006.01) |
| *H04W 24/04* | (2009.01) |

(52) U.S. Cl.
CPC ...... *H04L 29/08612* (2013.01); *H04L 12/2681* (2013.01); *H04L 43/103* (2013.01); *H04L 67/145* (2013.01); *H04W 24/04* (2013.01)

(58) Field of Classification Search
CPC ................................................ H04L 29/08612
See application file for complete search history.

(56) References Cited

U.S. PATENT DOCUMENTS

| | | | |
|---|---|---|---|
| 7,680,038 B1* | 3/2010 | Gourlay ......................... | 370/230 |
| 2006/0123119 A1* | 6/2006 | Hill et al. ....................... | 709/227 |
| 2006/0182141 A1* | 8/2006 | Duggirala et al. ............. | 370/465 |
| 2008/0205288 A1* | 8/2008 | Herzog .......................... | 370/252 |
| 2009/0307715 A1 | 12/2009 | Santamaria et al. | |
| 2010/0312899 A1 | 12/2010 | Herzog et al. | |
| 2010/0325306 A1* | 12/2010 | Vimpari et al. ................ | 709/233 |
| 2012/0170496 A1 | 7/2012 | Yang et al. | |
| 2013/0007484 A1 | 1/2013 | Gobriel et al. | |
| 2013/0246641 A1* | 9/2013 | Vimpari et al. ................ | 709/228 |
| 2013/0339781 A1* | 12/2013 | Wamorkar et al. ............ | 714/4.2 |

FOREIGN PATENT DOCUMENTS

TW        200620894        6/2006

* cited by examiner

*Primary Examiner* — Jason Mattis
(74) *Attorney, Agent, or Firm* — Alan D. Kamrath; Kamrath IP Lawfirm, P.A.

(57) ABSTRACT

A method of maintaining a network connection is used between an electronic apparatus and a server. The method includes the following steps: (a) sending an Nth test packet to the server, and the Nth test packet requests that the server reply to the electronic apparatus after waiting for an Nth time interval; (b) determining whether a reply for the Nth test package is received; (c) repeating step (a) if the reply for the Nth test packet is received; and calculating a period from the (N−1)th test packet being sent to the reply from the server being received if the reply for the Nth test packet is not received; and (d) sending a keep-alive packet periodically to the server according to the period for maintaining a connection between the electronic apparatus and the server when the electronic apparatus is switched to a standby/sleep mode.

5 Claims, 4 Drawing Sheets

METHOD OF MAINTAINING A CONNECTION AND ELECTRONIC APPARATUS USING THE SAME

BACKGROUND OF THE INVENTION

1. Field of the Invention

The present invention relates to a method of maintaining a network connection. More particularly, the present invention relates to a method of maintaining a network connection between an electronic apparatus and a server.

2. Description of the Related Art

If the common user wants to connect to a remote server via a computer, the user must build a connection path via a network or other related devices (such as a router or a switch). In the prior art, the computer uses a fixed IP. Thus, if the computer and the server are disconnected, the server can still find the corresponding computer to connect via the fixed IP address. However, most computers currently use a dynamic IP. If the computer does not send a packet to the server within a certain time, the router in the connection path may close the port of the computer, such that the server will be unable to find the IP address of the corresponding computer, and such that the computer and the server will be disconnected. At this point, the computer must initiate a connection to the server to restore the previous connection state. However, if the computer is in a special mode (such as a sleep mode or a standby mode), the computer must send the packets periodically to the server for maintaining the connection between the computer and the server.

If the abovementioned computer sends the packets too often, the computer resources will be consumed unnecessarily. If the time interval between packets is too long, the server and the computer may be disconnected. Also, the connection path between the computer and the server usually passes through multiple routers, and the time setting for closing the port of every router is different. Therefore, it is necessary to determine a preferred interval for the computer to send the packet.

SUMMARY OF THE INVENTION

It is an object of the present invention to provide a method of maintaining a network connection between an electronic apparatus and a server.

To achieve the abovementioned object, the method of maintaining a network connection of the present invention is used between an electronic apparatus and a server. The method includes the following steps: (a) sending an Nth test packet to the server, and the Nth test packet requests that the server reply to the electronic apparatus after waiting for an Nth time interval, wherein N is a positive integer; (b) determining whether a reply for the Nth test packet is received, wherein the reply is sent by the server; (c) repeating step (a) if the reply for the Nth test packet is received, and if the reply for the Nth test packet is not received, calculating a period from the (N−1)th test packet being sent to the reply from the server being received; and (d) sending a keep-alive packet to the server according to the period for maintaining a connection between the electronic apparatus and the server when the electronic apparatus is switched to a standby/sleep mode.

In another embodiment of the method of maintaining a network connection of the present invention, the present invention includes the following steps: (a) sending an Nth test packet to the server, and the Nth test packet requests that the server reply to the electronic apparatus after waiting for an Nth time interval, wherein N is a positive integer; (b) determining whether a reply for the Nth test packet is received, wherein the reply is sent by the server; (c) repeating step (a) if the reply for the Nth test packet is received, and if the reply for the Nth test packet is not received, repeatedly sending the (N−1)th test packet and determining whether all the replies for the (N−1)th test packets which are sent by the server are received; (d) if all the replies for the (N−1)th test packets repeatedly sent by the server are received, calculating a period from the (N−1)th test packet being sent to the reply from the server being received, and if not all the replies for the (N−1)th test packets repeatedly sent by the server are received, calculating a period from the (N−2)th test packet being sent to the reply from the server being received; and (e) sending a keep-alive packet to the server according to the period for maintaining a connection between the electronic apparatus and the server when the electronic apparatus is switched to a standby/sleep mode.

Via the design of the present invention, a preferred period that the electronic apparatus sends the packet to the server can be determined. On the one hand, it can maintain the connection between the electronic apparatus and the server in the standby/sleep mode and prevent the connection from being disconnected. On the other hand, it can extend the time interval which packets are sent to the greatest interval possible to reduce the consumption of the resources of the electronic apparatus.

DETAILED DESCRIPTION OF THE PREFERRED EMBODIMENTS

These and other objects and advantages of the present invention will become apparent from the following description of the accompanying drawings, which disclose several embodiments of the present invention. It is to be understood that the drawings are to be used for purposes of illustration only, and not as a definition of the invention.

In one embodiment of the present invention, the electronic apparatus can be a computer, a portable electronic apparatus, or other electronic apparatus with a network connecting function, the server can be a common server host or other similar devices with a server function, but the present invention is not limited to that design.

Figure 1:
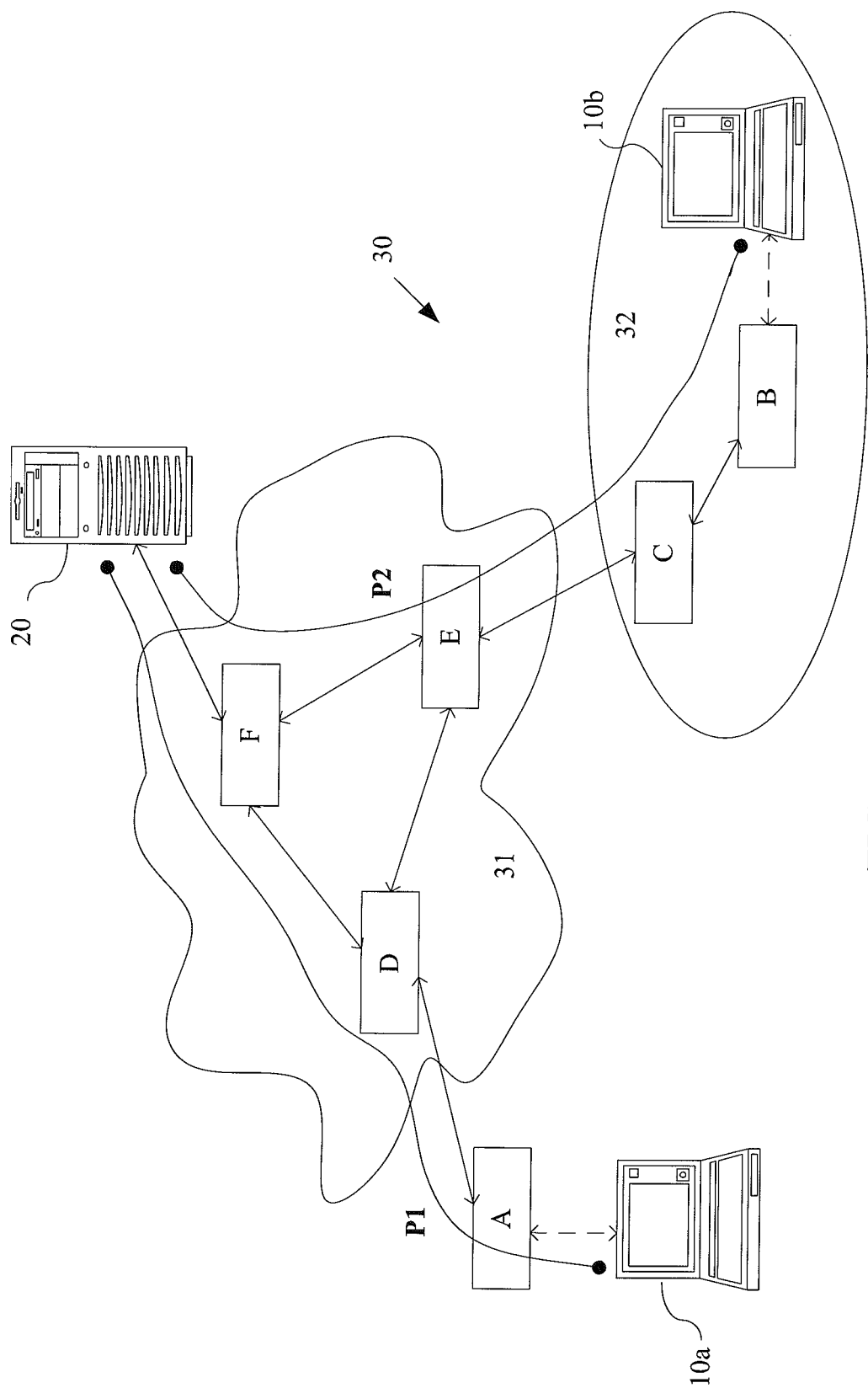
FIG. 1 illustrates a schematic drawing of multiple electronic apparatus connected to the server via the network in the present invention.

Please refer to FIG. 1, which illustrates a schematic drawing of multiple electronic apparatus connected to the server 20 via the network 30 in the present invention.

As shown in FIG. 1, the first electronic apparatus 10a and the second electronic apparatus 10b connect to the server 20 via the network 30. In the network 30, there are multiple routers A~F, allowing the first electronic apparatus 10a and the second electronic apparatus 10b, according to their position, to form the connection path to the server 20 via different routers. For example, the first electronic apparatus 10a can connect to the server 20 via the routers A, D, F in the internet 31 to form the connection path P1. The second electronic apparatus 10b can connect to the server 20 via the routers B, C in the local area network 32 and the routers E, F in the internet 31 to form a different connection path P2.

Figure 2:
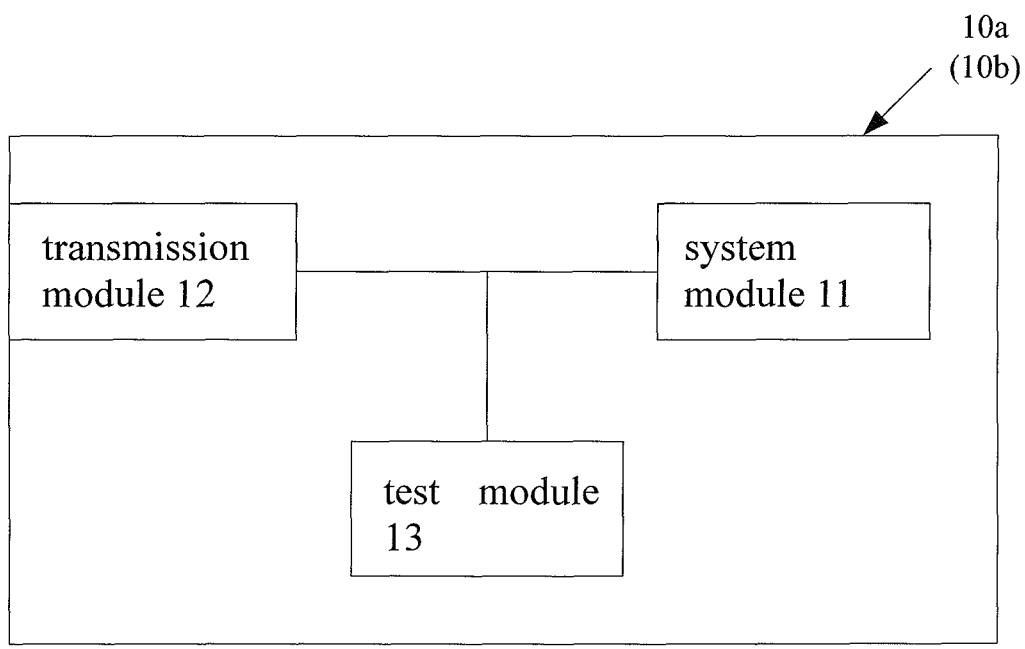
FIG. 2 illustrates a system block diagram of the electronic apparatus in the present invention.

Please refer to FIG. 2, which illustrates a system block diagram of the first electronic apparatus 10a or the second electronic apparatus 10b of the present invention. As shown in FIG. 2, the first electronic apparatus 10a or the second electronic apparatus 10b of the present invention can comprise a system module 11, a transmission module 12, and a test module 13. The system module 11 can be one of a hardware, a software, a firmware, or a combination of the hardware, the software, and the firmware. For example, the system module 11 can be a central processing unit, or an integration of the central processing unit within the operating system, but the present invention is not limited to that design. According to the user's command or setting, the system module 11 can switch the first electronic apparatus 10a or the second electronic apparatus 10b to be in a normal operating mode or in a standby/sleep mode, and execute the operating order. In the standby/sleep mode, the system module 11 continuously produces a keep-alive packet and sends the keep-alive packet to the server via the transmission module 12 to maintain the connection to the server. The transmission module 12 is used for sending the packets to the server or for receiving the reply from the server. The transmission module 12 can be a single network processing chip or a combination of the ports and the transmission module 12.

The test module 13 is used for producing the different test packets to be sent to the server via the transmission module 12. According to the reply for each packet from the server, the test module 13 determines and dynamically decides a preferred sending period for the abovementioned keep-alive packet. In one embodiment of the present invention, the test module 13 can be an application, but the present embodiment is not limited to that design. The test module 13 can also be a combination of the hardware and a firmware with the same function. The abovementioned test packet can also be a user datagram protocol (UDP) packet.

It is to be known that, for the electronic apparatus, which must connect to the router via the access point (AP), the electronic apparatus not only maintains the connection to the router but also needs to maintain the connection to the access point to prevent the network from being disconnected. The access point irregularly sends the packets to the connecting electronic apparatus, and the electronic apparatus uses the driver and the firmware of its own network card (such as the above-mentioned transmission module 12) to process the packets and to reply to the access point to maintain the connection between the electronic apparatus and the access point. Under the premise that the electronic apparatus connects to the access point, the electronic apparatus sends the abovementioned test packet to the server via the router. Since the technique of maintaining the connection between the electronic apparatus and the access point is already disclosed in the prior art, there is no need for further description.

Figure 3:
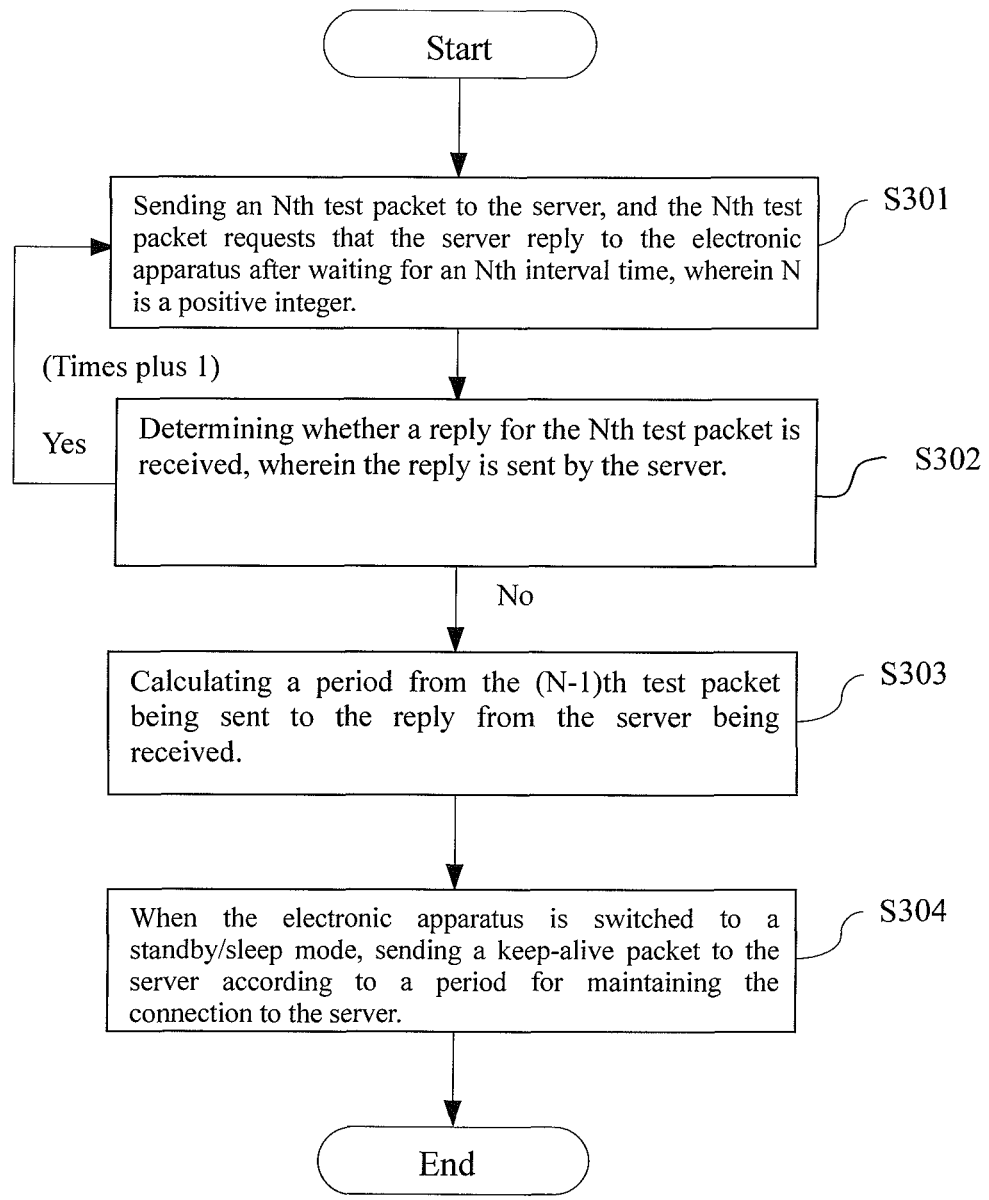
FIG. 3 illustrates a flowchart of the method of maintaining a network connection of the first embodiment of the present invention.

Please refer to FIG. 3, which illustrates a flowchart of the first embodiment of the method of maintaining a network connection of the present invention. It is to be known that the following description uses the first electronic apparatus 10a and the connection path P1 of the server 20 in FIG. 1 and FIG. 2 as an example to describe the method of maintaining a network connection of the present invention, but the present invention is not limited to that application. The method can be changed according to the structure of the electronic apparatus and the connection path P1 of the server 20. As shown in FIG. 3, the method of maintaining a network connection of the present invention comprises Step S301 to Step S304. Each step of the method will be described in detail below.

Step S301: sending an Nth test packet to the server 20, and the Nth test packet requests that the server 20 reply to the first electronic apparatus 10a after waiting for an Nth time interval, wherein N is a positive integer.

When the first electronic apparatus 10a is in the normal operating mode, the test module 13 can send the test packets from once to several times to the server 20 via the transmission module 12. The 1st test packet requests that the server 20 reply for the 1st test packet to the first electronic apparatus 10a after waiting for a time interval. The time interval is a default value of the test module 13 or a setting time which is set by the user, and the time interval can be a few seconds to tens of seconds. When the first electronic apparatus 10a sends the 2nd test packet, the 2nd test packet requests that the server 20 reply for the 2nd test packet to the first electronic apparatus 10a after waiting for two time intervals, and so on. If the first electronic apparatus 10a sends the Nth test packet, the Nth test packet requests that the server 20 reply for the Nth test packet to the first electronic apparatus 10a after waiting N time intervals, wherein N is a positive integer.

For example, if the time interval is set to 5 seconds, then the 1st test packet sent by the first electronic apparatus 10a will request that the server 20 send the response packet for the 1st test packet after receiving the test packet and waiting for the interval of 5 seconds. If the first electronic apparatus 10a sends the 2nd test packet, then after the server 20 receives the test packet, the server 20 is asked to wait 10 seconds (two time intervals of 5 seconds) to send the response packet for the 2nd test packet, and so on.

Step S302: determining whether a reply for the Nth test packet is received, wherein the reply is sent by the server 20.

Theoretically, when the connection between the first electronic apparatus 10a and the server 20 is maintained, the server 20 will reply for the packet of the first electronic apparatus 10a. If the connection between the first electronic apparatus 10a and the server 20 is disconnected, the response packet sent by the server 20 will not be able to be sent to the first electronic apparatus 10a. Therefore, after the test module 13 of the first electronic apparatus 10a sends the Nth test packet to the server 20, then according to the Nth test packet, the test module 13 will determine whether the reply which is sent by the server 20 for the Nth test packet is received to determine the following step.

In one embodiment of the present invention, via determining whether the waiting time exceeds the round-trip time of a packet plus the sum of an N time interval corresponding to the Nth test packet, the test module 13 can determine if the reply sent by the server 20 for the Nth test packet is received, but the present invention is not limited to that design. The packet round-trip time is the total time from a packet being sent from the electronic apparatus 10a to the server 20 to the immediate response by the server 20 being received; i.e., the packet round-trip time is the total back and forth time from the first electronic apparatus 10a sending the packet to the first electronic apparatus 10a receiving the reply for the packet when the server 20 is not asked to wait. The sum of the packet round-trip time plus the N time interval, which corresponds to the Nth test packet, is the theoretical total time between when the Nth test packet is sent and when the reply for the Nth test packet is received.

If the test module 13 receives the reply which is sent by the server 20 for the Nth test packet, which occurs after the server 20 waits for N time intervals corresponding to the Nth test packet, the connection between the first electronic apparatus 10a and the server 20 is still maintained. Therefore, the waiting time interval can be increased until the preferred period for sending packets to maintain the connection is determined. At this point, the test module 13 returns to Step S301 to execute the sending of the next test packet.

Step S303: calculating a period from the (N−1)th test packet being sent to the reply from the server 20 being received.

If the test module 13 does not receive the reply sent by the server 20 for the Nth test packet, which means that after the server 20 waits for an N time interval corresponding to the Nth test packet, the connection between the first electronic apparatus 10a and the server 20 is disconnected. Therefore, the test packet can be backtracked to the previous test packet (the (N−1)th test packet), and the period from the first electronic apparatus 10a sending the (N−1)th test packet to the reply from the server 20 being received is calculated. When N=1, then if the reply sent by the server 20 for the 1st test packet is not received, the period is determined to be the abovementioned packet round-trip time in the common state.

Step S304: when the electronic apparatus is switched to a standby/sleep mode, sending a keep-alive packet to the server 20 according to a period for maintaining the connection to the server 20.

After the period is determined, the test module 13 can inform the system module 11. After the first electronic apparatus 10a is switched to the standby/sleep mode, the system module 11 will periodically and continuously send the keep-alive packet to the server 20 according to the period to maintain the connection to the server 20.

The following description includes an implementation of the method of maintaining a network connection in the first embodiment of the present invention. Table 1 represents the assumed value of the waiting time for each router A~F to close the port; and Table 2 represents the result of the connection test between the server 20 and the first electronic apparatus 10a for the first embodiment of the method of maintaining a network connection of the present invention.

TABLE 1

| | Router | | | | | |
|---|---|---|---|---|---|---|
| | A | B | C | D | E | F |
| Waiting Time (sec) | 50 | 60 | 90 | 32 | 40 | 70 |

TABLE 2

(first electronic apparatus 10a)

| Nth Test Packet | Time interval (sec) | Response received from server |
|---|---|---|
| 1 | 5 | Yes |
| 2 | 10 | Yes |
| 3 | 15 | Yes |
| 4 | 20 | Yes |
| 5 | 25 | Yes |
| 6 | 30 | Yes |
| 7 | 35 | No |

As shown in Table 1, each router A~F sets the waiting time for closing the port. If no packets pass through the port of the router that is in use for more than the waiting time, the router will automatically close the port to end the original usage state, so that the port can be used for connecting to other devices. Since the brand and the design specifications of every router A~F are different, each router A~F may have different waiting times. Since in practical application, the user cannot know the waiting times of each router A~F, each waiting time is just an assumed value, and the assumed values are not limited to the values shown in Table 1.

As shown in Table 2, in the implementation, the first electronic apparatus 10a connects to the server 20 via the connection path P1. If every time interval is 5 seconds, and the abovementioned packet round-trip time is usually very short (in the present implementation, the packet round-trip time is assumed to be 0 seconds for the convenience of description), the period from the first electronic apparatus 10a sending the Nth test packet to the reply for the Nth test packet from the server 20 being received is substantially equal to the N time interval corresponding to the Nth test packet. However, the present invention is not limited to that design.

Please refer to FIG. 1, FIG. 2, Table 1, and Table 2. When the method of maintaining a network connection in the first embodiment of the present invention is applied to the first electronic apparatus 10a, first of all, the first electronic apparatus 10a sends the $1^{st}$ test packet to the server 20, and the $1^{st}$ test packet requests that the server 20 send the response packet to the first electronic apparatus 10a after waiting for the time interval of 5 seconds. Because the time interval is less than the waiting time of each router A, D, F in the connection path P1, the server 20 can send the response packet of the $1^{st}$ test packet to the first electronic apparatus 10a smoothly, allowing the first electronic apparatus 10a to be able to send the next test packet. Although the following $2^{nd}$ to $6^{th}$ test packets cumulatively add 5 seconds for each time interval, the time interval of 30 seconds, which is corresponding to the $6^{th}$ test packet, is still less than the waiting time of each router A, D, F, which represents that the server 20 can send the response packets for the $2^{nd}$ to $6^{th}$ test packet to the first electronic apparatus 10a smoothly.

Then when the first electronic apparatus 10a sends the 7th test packet to the server 20, the time interval of 35 seconds that the 7th test packet requests that the server 20 wait is more than the waiting time of 30 seconds of the router D in the connection path P1. Therefore, during the process of the server 20 sending the response packet for the 7th test packet to the first electronic apparatus 10a, the port for the router D to connect to the router A is closed, and the connection is disconnected, so the response packet cannot to be sent to the first electronic apparatus 10a. After the test module 13 of the first electronic apparatus 10a determines that the response packet sent by the server 20 for the 7th test packet is not received, the time interval of 35 seconds is determined to be too long, and as a result, the test module 13 will trackback to be the state of the 6th test packet, and the time (30 seconds in the present embodiment) from the 6th test packet being sent to the reply from the server 20 being received is determined to be the period. After the first electronic apparatus 10a is switched to the standby/sleep mode, the system module 11 sends the keep-alive packet to the server 20 according to the period of 30 seconds to maintain the connection between the first electronic apparatus 10a and the server 20.

Figure 4:
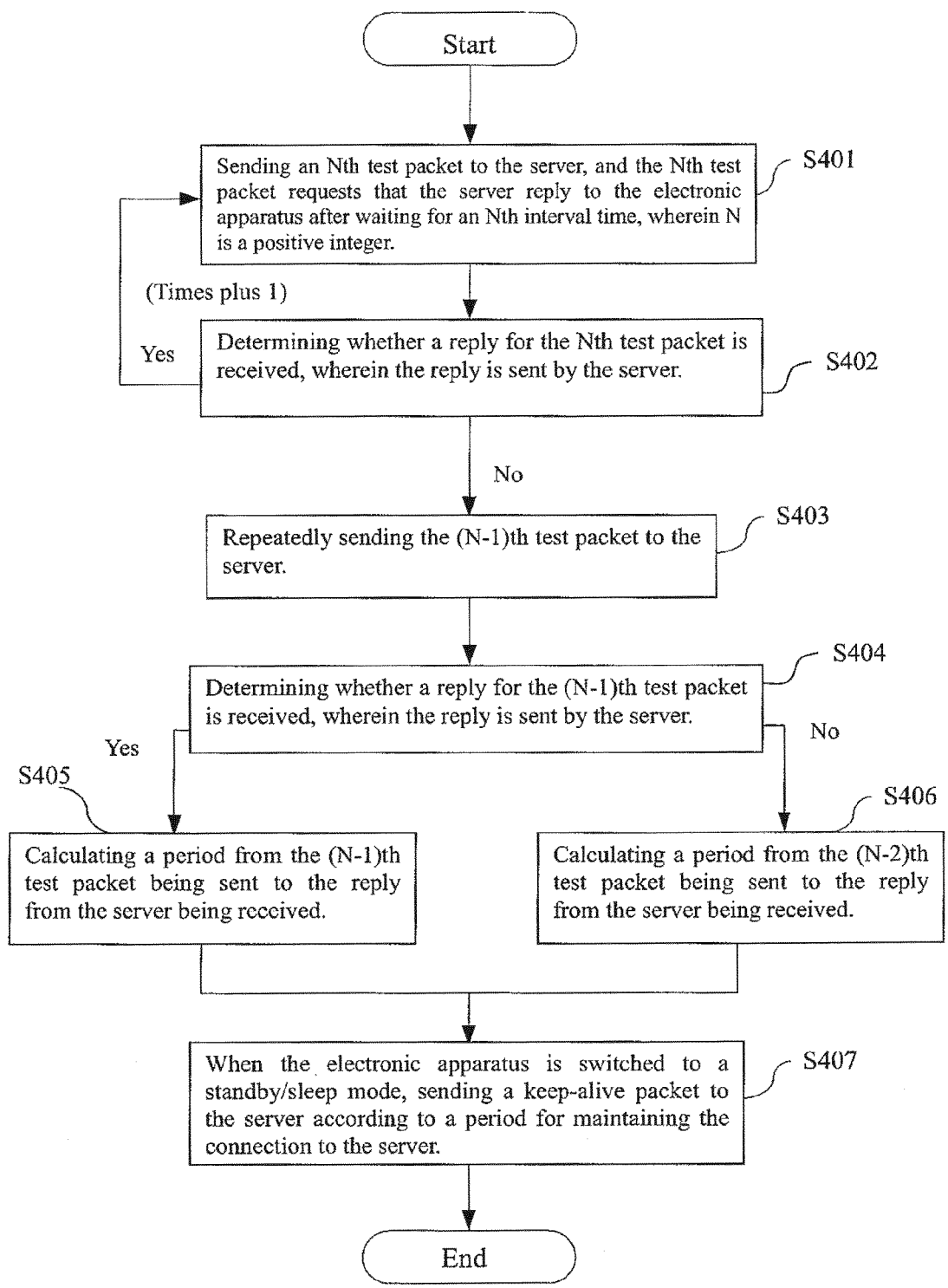
FIG. 4 illustrates a flowchart of the method of maintaining a network connection of the second embodiment of the present invention.

Please refer to FIG. 4, which illustrates a flowchart of the second embodiment of the method of maintaining a network connection of the present invention. It is to be known that the following description uses the electronic apparatus 10b and the connection path P2 of the server 20 as shown in FIG. 1 and FIG. 2 as an example to describe the method of maintaining a network connection of the present invention, but the present invention is not limited to that application. It can be changed according to the structure of the electronic apparatus or changes in the connection path of the server 20. As shown in FIG. 4, the second embodiment of the method of maintaining a network connection of the present invention includes Step S401 to Step S406, wherein Steps S401 and S402 are the same as Steps S301 and S302 of the abovementioned first embodiment, so there is no need for further description. Each new step of the method will be described in detail below.

Step S401: sending an Nth test packet to the server 20, and the Nth test packet requests that the server 20 reply to the second electronic apparatus 10*b* after waiting for an Nth time interval, wherein N is a positive integer.

Step S402: determining whether a reply for the Nth test packet is received, wherein the reply is sent by the server 20.

If the test module 13 receives the reply sent by the server 20 for the Nth test packet, the test module 13 returns to Step S401 to execute the sending of the next test packet.

Step S403: repeatedly sending the (N−1)th test packet to the server 20.

If the test module 13 does not receive the reply from the server 20 for the Nth test packet, then after the server 20 waits for the N time intervals corresponding to the Nth test packet, the connection between the second electronic apparatus 10*b* and the server 20 may be disconnected. Therefore, the test packet can be backtracked to the previous test packet, which means the (N−1)th test packet. If the period from the (N−1)th test packet being sent to the reply for the packet from the server 20 being received is similar to the waiting time of some routers, the connection may be unstable, and the single test result may not reflect the actual situation. Therefore, the test module 13 will repeatedly send a plurality of (N−1)th test packets to the server 20. In the present embodiment, the test module 13 sends the (N−1)th test packet to the server 20 at least 3 times. However, the number of times that the (N−1)th test packet is sent can be changed according design requirements.

Step S404: determining whether the replies for all (N−1)th test packets are received, wherein the replies are sent by the server 20.

After the test module 13 repeatedly sends the (N−1)th test packets to the server 20, the test module 13 determines whether the replies for all (N−1)th test packets are received. If the test module 13 determines that the replies for all (N−1)th test packets are received, Step S405 is executed. If the test module 13 determines that not all the replies for all (N−1)th test packets are received, Step S406 is executed.

Step S405: calculating a period from the (N−1)th test packet being sent to the reply from the server 20 being received.

If the test module 13 receives all the replies for the (N−1)th test packets from the server 20, which represents that the time from the second electronic apparatus 10*b* sending the (N−1)th test packet to the reply from the server 20 being received is less than the waiting time of each router, which in turn indicates that the connection is stable in the current situation, then the time from the (N−1)th test packet being sent to the reply from the server 20 being received is calculated, and the result is determined to be the period.

Step S406: calculating a period from the (N−2)th test packet being sent to the reply from the server 20 being received.

If the test module 13 cannot receive all the replies for all the (N−1)th test packets from the server 20, it represents that the (N−1) time interval corresponding to the (N−1)th test packet may approximate the waiting time of some routers. If the network transmission encounters processing delays, the time error caused by a delay plus the (N−1) time interval will exceed the waiting time of some routers, allowing the connection between the second electronic apparatus 10*b* and the server 20 to be disconnected, and the connection status will also be relatively unstable. Therefore, the test module 13 can backtrack the current test packet to the previous test packet (the (N−2) test packet), the time from the second electronic apparatus 10*b* sending the (N−2) test packet to the reply from the server 20 being received is calculated, and the result is determined to be the period.

The method further includes Step S407 after Step S405 or Step S406, Step S407: when the electronic apparatus is switched to the standby/sleep mode, sending the keep-alive packet to the server 20 according to the period for maintaining the connection to the server 20.

After the period is determined, the test module 13 can inform the system module 11. After the second electronic apparatus 10*b* is switched to the standby/sleep mode, the system module 11 will periodically and continuously send the keep-alive packet to the server 20 according to the period calculated in Step S404 or Step S405 to maintain the connection to the server 20.

The following description includes an implementation of the second embodiment of the method of maintaining a network connection of the present invention. Table 3 represents the result of the connection test between the server 20 and the second electronic apparatus 10*b* for the second embodiment of the method of maintaining a network connection of the present invention.

TABLE 3

| (second electronic apparatus 10b) | | |
| --- | --- | --- |
| Nth test packet | Time interval (sec) | Response received from server |
| 1 | 5 | Yes |
| 2 | 10 | Yes |
| 3 | 15 | Yes |
| 4 | 20 | Yes |
| 5 | 25 | Yes |
| 6 | 30 | Yes |
| 7 | 35 | Yes |
| 8 | 40 | Yes/No |
| 9 | 45 | No |

As shown in Table 3, in the implementation, the second electronic apparatus 10*b* connects to the server 20 via the connection path P2. If every time interval is 5 seconds and the abovementioned packet round-trip time is usually very short (in the present implementation, the packet round-trip time is assumed to be 0 seconds for the convenience of description), then the period from the second electronic apparatus 10*b* sending the Nth test packet to the reply for the packet from the server 20 being received is substantially equal to the N time interval corresponding to the Nth test packet. However, the present invention is not limited to that design.

Please refer to FIG. 1, FIG. 2, Table 1, and Table 3. When the first embodiment of the method of maintaining a network connection of the present invention is applied to the second electronic apparatus 10*b*, first of all, the second electronic apparatus 10*b* sends the $1^{st}$ test packet to the server 20, and then the $1^{st}$ test packet requests that the server 20 send the response packet to the second electronic apparatus 10*b* after waiting for the time interval of 5 seconds. Because the time interval is less than the waiting time of each router B, C, E, F in the connection path P1, the server 20 can send the response packet of the $1^{st}$ test packet to the second electronic apparatus 10*b* smoothly, allowing the second electronic apparatus 10*b* to be able to send the next test packet. Although the following $2^{nd}$ to $7^{th}$ test packets cumulatively add 5 seconds for each time interval, the time interval of 35 seconds corresponding to the $7^{th}$ test packet is still less than the waiting time of each router B, C, E, F, which represents that the server 20 can send the response packets for the $2^{nd}$ to $7^{th}$ test packets to the second electronic apparatus 10b smoothly.

Then, when the second electronic apparatus 10b sends the 8th test packet to the server 20, the time interval of 40 seconds that the 8th test packet asks the server 20 to wait is approximately equal to the waiting time of 40 seconds for the router E in the connection path P2. During the process of the server 20 sending the response packet for the 8th test packet to the second electronic apparatus 10b, if the network works smoothly, the response packet can still be delivered before the port of the router E closes, and then the second electronic apparatus 10b can proceed to sending the 9th test packet. If the network is unstable and the delivery is delayed, the port of the router E may be closed, allowing the connection to be disconnected, and the response packet cannot be delivered to the second electronic apparatus 10b. At this point, the method of the abovementioned description of the first embodiment of the present invention is used to backtrack to the 7th test packet, and the time from the 7th test packet being sent to the reply from the server 20 being received is determined to be the period. In the present embodiment, the network is assumed to be relatively stable, allowing the second electronic apparatus 10b to proceed to sending the 9th test packet.

When the second electronic apparatus 10b sends the 9th test packet to the server 20, the time interval of 45 seconds that the 9th test packet requests the server 20 to wait exceeds the waiting time of 40 seconds for the router E in the connection path P2. Therefore, during the process of the server 20 sending the response packet for the 9th test packet to the second electronic apparatus 10b, the port for the router E to connect to the router C is closed and the connection is thus disconnected, so the response packet cannot to be sent to the second electronic apparatus 10b. After the test module 13 of the second electronic apparatus 10b determines that the response packet sent by the server 20 for the 9th test packet is not received, the time interval of 45 seconds is determined to be too long. Consequently, the test module 13 will trackback to the state of the 8th test packet.

However, in the present embodiment, in order to make sure that the second electronic apparatus 10b can smoothly receive the response packet, which means that the connection between the second electronic apparatus 10b and the server 20 is stable, the test module 13 will repeatedly send the test packet at least 3 to 8 times. If the second electronic apparatus 10b receives all the response packets for the 8 test packets, it represents that the corresponding time interval of 40 seconds is appropriate. Therefore, the time (40 seconds in the present embodiment) from the 8th test packet being sent to the second electronic apparatus 10b receiving the reply from the server 20 is determined to be the period.

If the second electronic apparatus 10b does not receive the response packets for all 8th test packets, then the time from the 8th test packet being sent to the reply from the server 20 being received may exceed the waiting time of the router, allowing the connection to be disconnected. Therefore, the second electronic apparatus 10b will trackback to the previous test packet (the 7th test packet), and the time (35 seconds in the present embodiment) from the 7th test packet being sent to the reply from the server 20 being received is determined to be the period.

Via the design of the present invention, the electronic apparatus can determine a preferred period of the maximum allowable extent and periodically send a keep-alive packet to the server when switched to the standby/sleep mode to maintain the connection to the server. Therefore, when necessary, the server can remotely wake the electronic apparatus for information access via the network at any time. Meanwhile, the design of the present invention can significantly reduce the packet transmission times to reduce consumption of the resources of the electronic apparatus.

It is noted that the above-mentioned embodiments are only for illustration. It is intended that the present invention cover modifications and variations of this invention provided they fall within the scope of the following claims and their equivalents. Therefore, it will be apparent to those skilled in the art that various modifications and variations can be made to the structure of the present invention without departing from the scope or spirit of the invention.

What is claimed is:

1. A method of maintaining a network connection, used between an electronic apparatus and a server, the method comprising:
   (a) sending an Nth test packet to the server, wherein the Nth test packet requests that the server reply to the electronic apparatus after waiting for an Nth time interval, wherein N is a positive integer;
   (b) determining whether a reply for the Nth test packet is received, wherein the reply is sent by the server;
   (c) repeating sending the Nth test packet to the server if the reply for the Nth test packet is received; if the reply for the Nth test packet is not received, repeatedly sending an (N−1)th test packet and determining whether replies for all the (N−1)th test packets which are repeatedly sent by the server are received;
   (d) if the replies for all the (N−1)th test packets repeatedly sent by the server are received, calculating a time from the (N−1)th test packet being sent to the reply from the server being received as a period; if not all the replies for all the (N−1)th test packets repeatedly sent by the server are received, calculating a time from an (N−2)th test packet being sent to a reply for the (N−2)th test packet from the server being received as the period; and
   (e) sending a keep-alive packet to the server according to the period for maintaining a connection between the electronic apparatus and the server when the electronic apparatus is switched to a standby/sleep mode.

2. The method of maintaining a network connection as claimed in claim 1, wherein repeatedly sending the (n−1)th test packet comprises repeatedly sending at least 3 (N−1)th test packets to the server.

3. The method of maintaining a network connection as claimed in claim 1, wherein determining whether the reply from the Nth test packet is received comprises determining whether a time for waiting for the server to reply exceeds a packet round-trip time plus a sum of N time intervals, wherein the packet round-trip time is the time from the electronic apparatus sending a packet to the reply from the server being received without delay.

4. The method of maintaining a network connection as claimed in claim 3, wherein when N=1, if the reply for the 1st test packet sent by the server is not received, the packet round-trip time is determined to be the period.

5. The method of maintaining a network connection as claimed in claim 1, wherein the time interval is 5 to 20 seconds.

* * * * *